United States Patent

Shull

[11] 3,953,113
[45] Apr. 27, 1976

[54] LASER MIRROR MOUNTING DEVICE
[75] Inventor: William A. Shull, Portola Valley, Calif.
[73] Assignee: Liconix, Mountain View, Calif.
[22] Filed: Nov. 8, 1974
[21] Appl. No.: 522,093

[52] U.S. Cl. ............................... 350/288; 248/476; 331/94.5 D
[51] Int. Cl.² .......................................... G02B 5/08
[58] Field of Search ............... 331/94.5 D; 350/288; 248/466, 474, 476, 479

[56] References Cited
UNITED STATES PATENTS

| | | | |
|---|---|---|---|
| 3,400,596 | 9/1968 | Laich | 331/94.5 D |
| 3,428,915 | 2/1969 | Leone et al. | 331/94.5 D |
| 3,875,530 | 4/1975 | Manoukian | 331/94.5 D |
| 3,883,820 | 5/1975 | Burns et al. | 331/94.5 D |
| 3,887,883 | 6/1975 | Garmar | 331/94.5 D |

*Primary Examiner*—John K. Corbin
*Assistant Examiner*—F. L. Evans
*Attorney, Agent, or Firm*—Boone, Schatzel & Hamrick

[57] ABSTRACT

A laser mirror mounting device adapted to provide for the exchangeability of sets of mirrors associated with various wavelengths of operation of a multi-wavelength laser without requiring realignment of the laser after each set of mirrors is changed. A housing, attachable to a laser support apparatus, is provided and includes an adjustable internal reference surface. The mirror mounting device is adapted for positioning within the housing and includes an external reference surface for adjustment relative to the internal reference surface of the housing. The device further includes support means for supporting a mirror relative to the laser and an adjustment means for adjusting the angular relationship of the mirror relative to the external reference surface. A housing cover engages the device for maintaining the external reference surface of the device in firm contact with the internal reference surface of the housing. Accordingly, after initial adjustment of each set of mirror mounting devices the previously aligned sets may be exchanged without requiring further adjustment. Therefore, in changing the wavelength of operation of the laser, the mirror mounting devices may be interchanged at will without requiring realignment of the laser.

13 Claims, 4 Drawing Figures

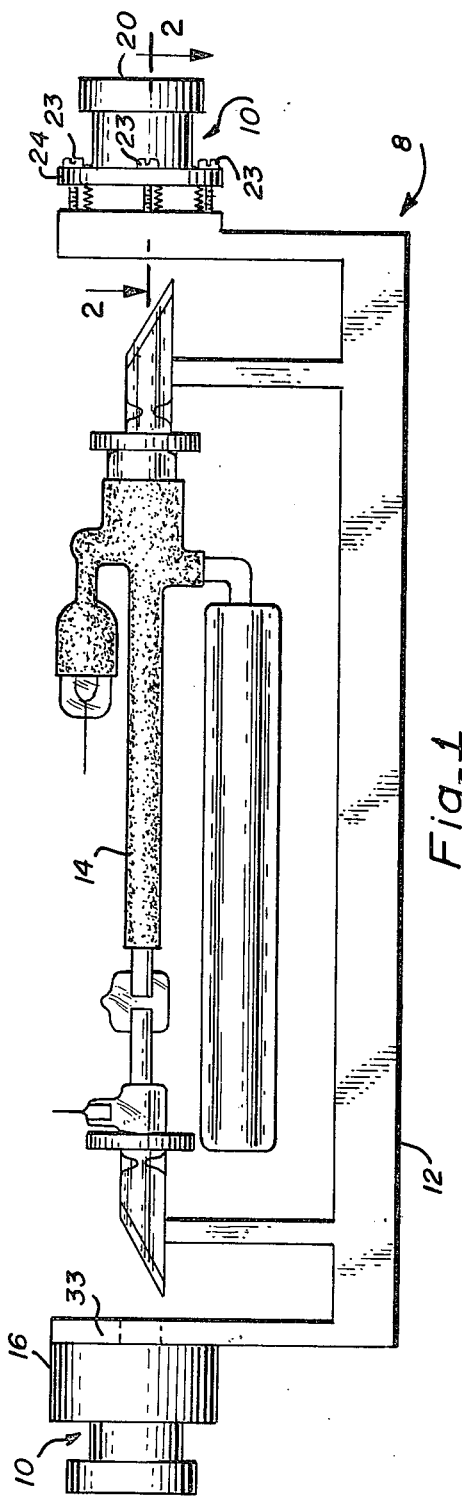
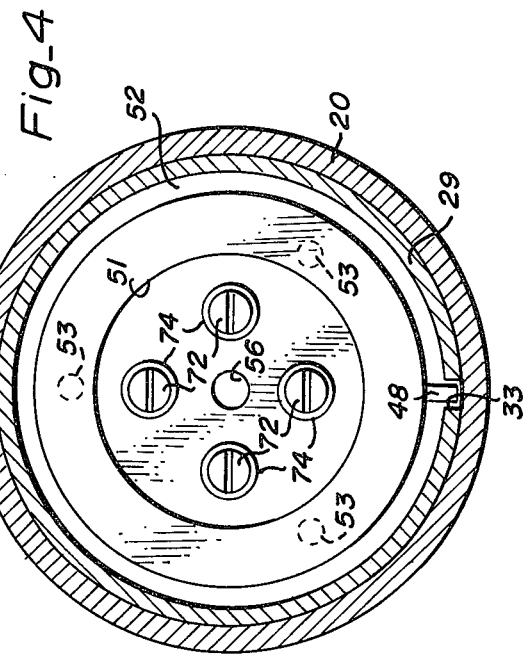
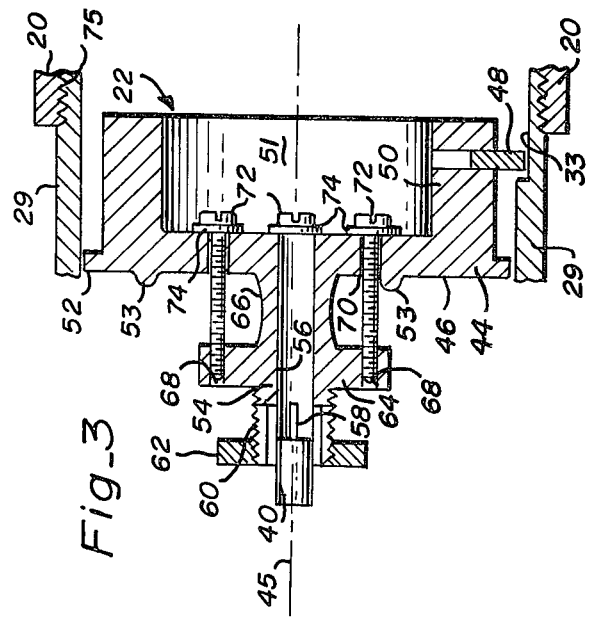

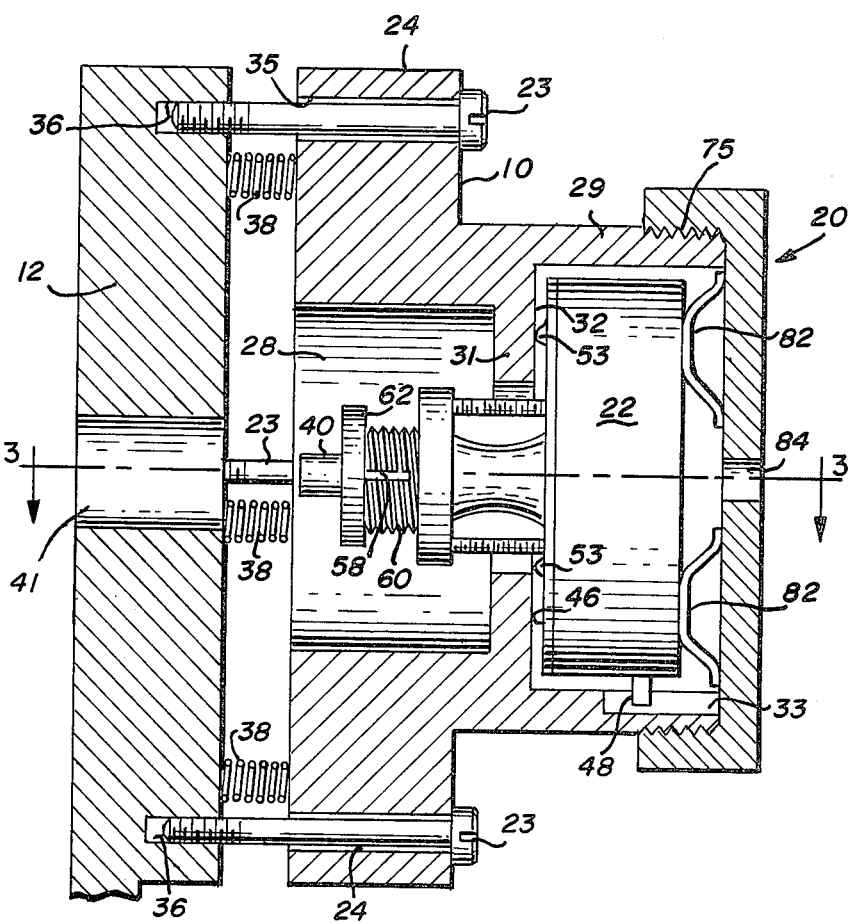
Fig_2

LASER MIRROR MOUNTING DEVICE

BACKGROUND OF THE INVENTION

1. Field of the Invention

The invention relates to a mirror mounting device for use with multi-wavelength lasers. More specifically, the invention relates to a mirror mounting device adapted to allow for the exchange of different mirror sets associated with the different wavelength operations of the laser without requiring realignment of the laser after exchanging a set of mirrors.

2. Description of the Prior Art

Many lasers are operable in a plurality of different wavelengths. Such lasers are referred to as multi-wavelength lasers and are capable of generating a plurality of laser beams of differing wavelengths. For example, a helium cadmium laser has two wavelengths of operation. One wavelength is in the blue range and the other is in the ultraviolet range. In some lasers the difference in the wavelengths associated with the different spectral lines require that different mirrors be used in the laser to obtain the different wavelengths of operation. In known prior art multi-wavelength laser structures, where that laser requires the use of different mirror sets for each wavelength of operation, it is necessary to realign the laser after each different mirror set is inserted into the laser. These realignment procedures consume time and deter the use of one laser for its various wavelengths of operation.

SUMMARY OF THE PRESENT INVENTION

It is therefore an object of the present invention to provide a laser mirror mounting device holding a set of mirrors for use with a multi-wavelength laser whereby after initial alignment of the mounting device, it may be removed and reinserted without the need of realignment of the laser.

It is another object of the invention to provide a laser mirror mounting device adapted to allow for fast and inexpensive exchange of mirrors of differing wavelengths in a multi-wavelength laser.

According to the present invention, the laser mirror mounting device is located within a housing and held in place by a housing cover. The housing forms an internal reference surface and incorporates means for adjusting the angular position of the internal reference surface relative to the laser. The mirror mounting device is insertable into the housing relative to the internal reference surface. The mirror mounting device includes an external reference surface and means for adjusting the angular plane of the mirror relative to the external reference surface. The external reference surface of the device is held firmly in place adjacent to the internal reference surface of the housing by the cover. The external reference surface of the mirror mounting device and the internal reference surface of the housing co-act to place the mirror in the same position with respect to the laser each time the device is inserted into the housing.

Basically, adjustment of the housing establishes a proper lasing position for the internal reference surface of the housing with respect to the laser. Adjustment within each mirror mounting device of the position of the mirror with respect to the external reference surface serves to compensate for variations among mirror mounting devices and mirrors associated with the same or different wavelengths of operation of the laser.

The initial alignment of the various sets of mirror mounting devices is accomplished by arbitrarily selecting one set of the mirror mounting devices as a reference standard. The housing and the reference set are then aligned for proper lasing operation. Once the reference set of devices is aligned, the alignment of the housing relative to the laser for all sets of mirrors is established and remains fixed. Thus, after the housing and reference set are aligned, the reference set is removed and the remaining sets of mirror mounting devices are then aligned individually. The remaining devices are aligned for proper laser operation by adjusting the mirror of that set with reference to the external reference surface of each device. The devices are adapted such that after each set of mirror mounting devices have been adjusted for proper lasing operation, they may be removed and subsequently reinserted into the housing without necessitating a realignment of the laser.

An advantage of the invention is that once the individual mirror mounting devices have been aligned, the operating wavelength of a multi-wavelength laser can be changed by simply inserting the devices with mirrors associated with the desired wavelength of operation.

Another advantage of the invention is that the selection of a set of mirror mounting devices as a standard is arbitrary, and therefore, no special expense is incurred to derive a standard for alignment purposes.

Still another advantage of the invention is the efficiency at which the mirrors can be interchanged to permit the laser to be switched between various wavelengths of operation. This encourages the use of a single multi-wavelength laser for various different wavelengths of operation.

The foregoing and other objects, features and advantages of the invention will be apparent from the following, more particular description of the preferred embodiment of the invention as illustrated in the accompanying drawings.

In the drawing:

FIG. 1 is a side elevational view of a laser apparatus having a pair of the laser mirror mounting devices inserted therein for proper lasing operation;

FIG. 2 is a cross-sectional side elevational view, taken along the line 2—2 of FIG. 1, illustrating one of the housings with a mirror mounting device inserted therein;

FIG. 3 is a cross-sectional view, taken along the line 3—3, of the mirror holder device of FIG. 2; and FIG. 4 is a rear elevational view of the mirror holder of FIG. 3.

DETAILED DESCRIPTION OF THE PREFERRED EMBODIMENT

FIG. 1 shows a laser apparatus, referred to be the general reference character 8. The laser apparatus 8 includes two housings 10 supported at opposing ends of a resonator structure 12 and a laser tube 14. The two housings 10 are in alignment with laser tube 14. As hereinafter described in greater detail, each of the housings 10 is adapted to support an individual mirror mounting device in alignment with the laser tube 14. In operation, a plurality of sets of mirror mounting devices are available wherein each set of devices supports mirrors associated with different laser wavelengths of operation. The availability of a plurality of different sets of mirror mounting devices allows the laser tube 14 to be operated at various different operating wavelengths depending on the application. Depending on the application of operation, the set of devices with the proper wavelength of operation are inserted in the housing 10.

The housings 10 are adapted to allow positional adjustment of the individual mirror mounting devices within the housing to assure proper lasing operation at the selected wavelength when power is applied to the lasing tube 14 of the laser apparatus 8. The housings 10 are identical in structure with the housing 10 on the left-hand side shown with a dust cover 16 in place. The housing 10 on the right side of the laser apparatus 8 is shown with the cover 16 removed.

Referring to FIG. 2, a cross-sectional view taken along line 2—2 of the housing 10 supported on the right-hand side of the apparatus of FIG. 1 is illustrated. The housing 10 employs an end cover, referred to by the general reference character 20, to hold a mirror mounting device referred to by the general reference character 22 in place. The housing 10 is mounted to the resonator structure 12 by means of four adjusting bolts 23, which are spaced at 90° intervals about an external end flange 24. An internal cavity 28 is formed within the housing 10. The cavity 28 has an opening at one end about the flange 24 and at the other end about the terminus of a wall 29. The peripheral walls of the cavity 28 are formed in part by the flange 24 and the wall 29. A circular internal flange 31 is machined within the cavity 28 and projects internally from the wall 29. The flange 31 establishes an 0-ring shaped internal reference surface 32. Also, an internal keyway slot 33 is machined in the circular wall 29.

As hereinafter further described, it is desirable to provide adjustment means to adjust the angular relationship of the plane of internal reference surface 32 relative to the resonator structure 12. The adjustment means includes the set of four adjustment bolts 23 extending through a set of bores 35 in the flange 24. The threaded end portion of the bolts 23 are each threaded into a threaded bore 36 in the resonator structure 12. A set of four springs 38 are attached between resonator structure 12 and flange 24. Adjustment of the angle of the internal reference surface 32 is obtained by adjusting the bolts 23. Springs 34 can be selectively compressed by tightening selectively bolts 23 so as to cause an angular displacement of the flange 24 with respect to the resonator structure 12. Positional variations of the flange 24 impart positional variations to the internal flange 31, thereby allowing the angle of the plane of the internal reference surface 32 within the housing 10 to be adjusted to a desired angle.

The mirror mounting device 22 is mounted within the cavity 28 of the housing 10 to support a laser mirror 40. The mirror 40 is supported in alignment with an opening 41 of the resonator structure 12. Referring to FIGS. 3 and 4, the mirror mounting device 22 is comprised of a circular sub-housing 44 having a central axis 45. The sub-housing 44 forms an annular external reference wall 46 coaxial with the axis 45. A key 48 projects radially outward from a cylindrical side wall 50 of the sub-housing 44. The key 48 is adapted to be received within the keyway 33 of the housing 10 to provide a means for angularly orientating the sub-housing 44 relative to the cavity 28. The side wall 50 and the reference wall 46 establish a cylindrical-shaped cavity 51 opening at one end about the end of the wall 50. A lip 52 is formed about the periphery of the intersection of the side wall 50 and the reference wall 46.

Extending from the outside surface of external reference wall 46 is a set of three hemispherically-shaped bodies 53. The bodies 53 are preferably comprised of a hard material, e.g., steel, and are spaced at increments of approximately 120° about the axis 45. The bodies 53 provide for intermediate coupling of the internal reference surface 32 of the housing 10 and the reference wall 46 of the sub-housing 44. The apexes of the three bodies 53 establish the points of contact and thereby positions the reference wall 46 relative to the reference surface 32 of the housing 10. The use of the three points facilitates the defining of an accurate reference plane which is not readily distorted and may be relied on for accurate and repeatable alignment of reference wall 46 with respect to reference surface 32 of the housing 10.

Projecting from the reference wall 46 and coaxial with the axis 45 is a projection 54. The projection 54 is integral with the wall 46 and forms an internal cylindrical, smooth-surfaced bore 56. The bore 56 opens at one end to the cavity 51. The mirror 40 is positioned about the other end of the bore 56 and projects therefrom. The free end of projection 54 includes four slots 58 which are positioned approximately 90° apart about the axis 45. The free end is tapered slightly about the slots 58 and carries external threads 60 to receive a sleeve nut 62. The slots 58, in combination with the sleeve nut 62, provide for controlling the expansion and contraction of the opening of the projection 54 about the end thereof. Thus, when the cylindrically-shaped mirror 40 is placed in position, a retaining force may be exerted on the mirror 40 to secure it in place. As the nut 62 is tightened, the slotted portions of the projection surrounding the mirror contract to exert holding force on the mirror 40 thereby retaining it in place. The nut may be loosened to release the retaining force on the mirror 40 is desired.

Intermediate to the terminal ends of the formed projection 54 is a flange 64. A bendable concave-shaped, thin-walled section 66 is formed within the projection 54 intermediate to the flange 64 and the reference wall 46. Four threaded bores 68 are positioned in the flange 64 at increments of approximately 90°. Four smooth-walled bores 70 extend through the reference wall 46. The position of each bore 70 is in substantial alignment with an associated threaded bore 68 of the flange 64. A threaded bolt 72 is positioned through each of the bores 70 and extends in threaded engagement with one of the bores 68. A washer 74 encompasses each of the bolts 72 to fit flush with the interior of the wall 46 as the bolt 72 is tightened. By controlling the tightness of the bolts 72, a controlled bending torque can be applied to the wall section 66, thereby controlling the degree of bending of the wall portion 66. Bending of the wall portion 66 in turn varies the angle of the flange 64 relative to the external reference surface 46. This in turn provides a means for adjusting the angle of the mirror 40 relative to the axis 45. The mirror 40 is effectively at the end of a lever arm projecting from the flange 64. The adjustment of the angular position of the mirror 40 is achieved by inserting a tool about the head of one or more of the bolts 72 and controlling the torque applied to wall section 66.

Returning to FIG. 2, the end cover 20 has internal threads 75 to permit it to be secured about the end of the wall 29 of the housing 10. A leaf spring 82 is engaged about the interior surface of the cover 20 for making interface contact with the end of the mirror mounting device 22. A passageway 84, coaxial with the cover 20, is cut in the cover to provide an outlet for laser beams transmitted through the mirror 40 in the mirror holding device 22. Thus, when the cover 20 is secured in place, the spring 82 is in abutment with the end of the mirror mounting device 22 thereby urging the hemispherically-shaped bodies 53 to be in abutment with the internal reference surface 32 of the internal flange 31.

Referring to FIGS. 1 and 2, the method for aligning the different sets of mirror mounting devices 22 for use with a specific laser apparatus 8 will be described. First a set of the mirror mounting devices 22, is inserted into a respective housing 10. Covers (not shown), somewhat modified from the cover 20, are engaged to the housings 10 to retain the devices 22 in place. The modified covers are substantially the same as the covers 20 except that it has a central opening larger than that of the passageway 84. The increased size opening is provided to allow a screwdriver or other adjustment tool to be placed in engagement with the heads of the bolts 72 of the mirror mounting device. With the devices 22 in place, and the modified cover secured, the adjustment bolts 23 and the adjustment bolts 72 of the assembled system are adjusted to obtain proper lasing operation for the installed set of devices 22. Adjustment bolts 23 are not further adjusted after the lasing operation has been obtained for the first set of devices 22.

The modified cover and the selected, adjusted devices 22 are then removed. Another set of devices 22 are inserted and the modified cover re-engaged. The newly inserted set of devices 22 are aligned for proper lasing operation by adjusting only adjustment bolts 72. Then that set of devices 22 are removed and the remaining sets of devices 22 to be used with the laser apparatus are successively inserted and adjusted by means of adjustment bolts 72.

Once alignment of all of the sets of mirror mounting devices 22 have been adjusted, the modified cover is replaced with the standard cover 20. Then, for operation of the laser apparatus 8 at a select wavelength, when it becomes necessary to change the wavelength of operation, the cover 20 is removed, the installed set of devices 22 removed, the desired set of devices 22 inserted and the cover 20 is replaced. No alignment is necessary. Thus, a multi-wavelength laser may be easily used for all its wavelength of operation merely by inserting the appropriate set of devices 22.

It is to be recognized that once initial alignment of the various devices 22 is completed, it is important that the device 22 be always used with the same housing 10. Thus, if the specific device 22 is aligned in the housing 10 on the right-hand side of the structure 12, it should always be used on that side. The same is true if it was aligned for the left side. To provide assurance that the individual devices 22 are mounted in the proper housing 10, each set of devices 22 and set of housings 10 should be marked with a "left" or "right" designation.

As herein before discussed, the selection of which set of mirror mounting devices 22 to be used as a quasi-standard is arbitrary. Therefore, it is not necessary to use a specifically manufactured standard set of mirror mounting devices as a reference for calibration of other sets of mirror mounting devices 22.

Although the use of mirror mounting devices 22 has been described for use in an adjustable housing 10, it should be understood the housing 10 need not be adjustable. Housing 10 may be unadjustable providing that the adjustment range of the mirror mounting devices 22 is sufficient to allow proper alignment by use of only the adjustment bolts 72 of the device 22.

While the invention has been particularly shown and described with reference to preferred embodiments thereof, it would be understood by those skilled in the art that various changes in form and detail may be made therein without departing from the spirit and scope of the invention.

What is claimed is:

1. A removable laser mirror mounting device for insertion into a housing of a multi-wavelength laser which is adapted to allow for the exchange of mirror mounting device sets associated with each wavelength of operation of the laser without requiring that the laser be realigned after each exchange of the laser mirror mounting device sets, the housing of the multi-wavelength laser having an internal reference surface, said device comprising:
   a main body forming an external reference surface for mating with the internal reference surface of the housing when said device is inserted into said housing;
   a mirror associated with one of the wavelengths of operation of said laser;
   holding means connected to said main body for receiving and fixedly holding said mirror; and
   adjusting means connected to said main body and to said holding means for adjusting the position of said holding means with respect to said external reference surface such that the reflective surface of said mirror may be positioned in a predetermined manner relative to said internal surface and said device may then be removed from and subsequently reinserted into said housing without requiring readjustment of said mirror.

2. A removable laser mirror mounting device as recited in claim 1 wherein
   said holding means comprises a deformable portion, and a flange extending perpendicular to and connected adjacent one end of said deformable portion, said flange having a plurality of receiving holes therein; and
   said main body comprises a wall perpendicular to said deformable portion and connected adjacent to an opposite end of said deformable portion, said wall having a plurality of reference holes therein, aligned with said receiving holes, and a plurality of bolts, with each one of said bolts passing through one of said reference holes into one of said receiving holes, whereby torque may be selectively applied to said deformable portion so as to effectively control the angular position of said mirror with reference to said external reference surface.

3. A removable laser mirror mounting device as recited in claim 2 wherein
   said reference holes are four in number and displaced relative to one another at substantially 90° of arc and said receiving holes are four in number and displaced relative to one another at substantially 90° of arc.

4. A removable laser mirror mounting device as recited in claim 2 and further comprising a plurality of hemispherical-shaped members extending from said wall toward said internal reference surface and wherein said external reference surface is part of said wall and is spatially defined by said hemispherical-shaped members.

5. A removable laser mirror mounting device as recited in claim 4 wherein
said hemispherical-shaped members are three in number and are separated at increments of substantially 120° of arc.

6. A removable laser mirror mounting device as recited in claim 1 wherein
said main body further comprises a key for establishing a constant rotational orientation of said device when inserted into said housing.

7. A removable laser mirror mounting apparatus for use with a multi-wavelength laser and adapted to allow for the exchange of mirror sets associated with each wavelength of operation without requiring that the laser be realigned after each exchange of mirror sets, said apparatus comprising in combination:
a housing having an internal reference surface;
a mirror mounting device having a main body forming an external reference surface for mating with said internal reference surface when said device is inserted into said housing, a mirror associated with one of said wavelengths of operation of said laser, holding means connected to said main body for receiving and fixedly holding said mirror, and adjusting means connected to said main body and to said holding means for adjusting the position of said holding means with respect to said external reference surface such that the reflective surface of said mirror may be positioned in a predetermined manner relative to said internal surface; and
cover means connected to said housing and coupled to said mirror mounting device for maintaining said external reference surface in contact with said internal reference surface so as to effectively define the same relative position of said mirror with respect to said internal reference surface each time said device is inserted into said housing.

8. A removable laser mirror mounting apparatus as recited in claim 7 wherein
said holding means includes a deformable portion with a flange perpendicular thereto, said flange being connected adjacent one end of said deformable portion and having a plurality of receiving holes therein; and said main body further includes a wall perpendicular to said deformable portion and connected adjacent an opposite end of said deformable portion, said wall having a plurality of reference holes therein, said reference holes being aligned with said receiving holes, and a plurality of bolts, with each one of said bolts passing through one of said reference holes into one of said receiving holes, whereby torque may be selectively applied to said deformable portion so as to effectively control the angular position of said mirror with reference to said external reference surface.

9. A removable laser mirror mounting apparatus as recited in claim 8 wherein
said reference holes are four in number and displaced relative to one another at substantially 90° of arc and said receiving holes are four in number and displaced relative to one another at substantially 90° of arc.

10. A removable laser mirror mounting apparatus as recited in claim 8 and further comprising a plurality of hemispherical-shaped members extending from said wall toward said internal reference surface and wherein
said external reference surface forms a portion of said wall and is spatially defined by said hemispherical-shaped members.

11. A removable laser mirror mounting apparatus as recited in claim 10 wherein
said hemispherical-shaped members are three in number and are separated at increments of substantially 120° of arc.

12. A removable laser mirror mounting apparatus as recited in claim 7 wherein
said main body further comprises a key for establishing a constant rotational orientation of said device when inserted into said housing.

13. A removable laser mirror mounting device as recited in claim 7 wherein
said cover means includes a spring member disposed to contact a rear portion of said main body so as to effectively urge said external reference surface toward said internal reference surface.

* * * * *